United States Patent
Jung et al.

(10) Patent No.: US 12,095,745 B2
(45) Date of Patent: Sep. 17, 2024

(54) COMPUTER NETWORK WITH AN IP SUBNETWORK AND A NON-IP SUBNETWORK AND BACKEND DEVICE, GATEWAY, FRONTEND DEVICE THEREFORE AND PROCEDURE FOR OPERATION THEREOF

(71) Applicant: Inventronics GmbH, Munich (DE)

(72) Inventors: Markus Jung, Feldkirchen (DE); Bernhard Siessegger, Unterschleissheim (DE); Jiye Park, Munich (DE); Prajosh Premdas, Freising (DE)

(73) Assignee: Inventronics GmbH, Munich (DE)

( * ) Notice: Subject to any disclaimer, the term of this patent is extended or adjusted under 35 U.S.C. 154(b) by 261 days.

(21) Appl. No.: 17/493,872

(22) Filed: Oct. 5, 2021

(65) Prior Publication Data
US 2022/0109659 A1    Apr. 7, 2022

(30) Foreign Application Priority Data
Oct. 5, 2020  (DK) .............................. PA202070675

(51) Int. Cl.
*H04L 29/06*    (2006.01)
*H04L 9/40*    (2022.01)

(52) U.S. Cl.
CPC ...... *H04L 63/0435* (2013.01); *H04L 63/0442* (2013.01); *H04L 63/166* (2013.01); *H04L 63/20* (2013.01)

(58) Field of Classification Search
CPC ............. H04L 63/0435; H04L 63/0442; H04L 63/166; H04L 63/20
See application file for complete search history.

(56) References Cited

U.S. PATENT DOCUMENTS 10,355,910 B1 *   7/2019   Kim ...................... H04W 28/06
10,985,910 B2 *   4/2021   Hennebert ............ H04L 9/3247
(Continued)

FOREIGN PATENT DOCUMENTS

CN    211180606 U    8/2020
EP    3525555 A2    8/2019
(Continued)

OTHER PUBLICATIONS

DK search report issued Feb. 12, 2021 re: Application No. PA202070675, pp. 4.

*Primary Examiner* — Yonas A Bayou
(74) *Attorney, Agent, or Firm* — Samson G. Yu

(57) ABSTRACT

A computer network may include a Non-IP subnetwork with a frontend device, an IP subnetwork with a backend device, and a gateway connecting the Non-IP subnetwork with the IP subnetwork and translating communication therebetween. The communication for authentication and/or encryption between the backend device and the gateway is an IP communication based on an IP security protocol and a Non-IP communication between the gateway and the frontend device. A gateway is configured to provide a virtual IP communication endpoint dedicated to the frontend where a secure end-to-end communication may be established between the backend device and the frontend device. The Non-IP communication is applied to transmit a transcription of the request datagram to the frontend device. The frontend device is configured to generate a response datagram and to transmit a transcription of the response datagram to the gateway by applying the Non-IP communication.

16 Claims, 2 Drawing Sheets

(56) References Cited

U.S. PATENT DOCUMENTS

| | | | |
|---|---|---|---|
| 11,212,314 B2* | 12/2021 | Fages-Tafanelli | .... H04L 63/102 |
| 2008/0265799 A1 | 10/2008 | Sibert | |
| 2018/0288013 A1* | 10/2018 | Hennebert | ............ H04W 12/08 |
| 2021/0067956 A1* | 3/2021 | Vigneswaran | ........ H04W 12/06 |

FOREIGN PATENT DOCUMENTS

| | | |
|---|---|---|
| WO | 2015054611 A1 | 4/2015 |
| WO | 2016075107 A1 | 5/2016 |

* cited by examiner

COMPUTER NETWORK WITH AN IP SUBNETWORK AND A NON-IP SUBNETWORK AND BACKEND DEVICE, GATEWAY, FRONTEND DEVICE THEREFORE AND PROCEDURE FOR OPERATION THEREOF

CROSS-REFERENCE TO RELATED APPLICATION

The present patent application claims priority, according to 35 U.S.C. § 119, from Danish Patent Application No. PA202070675 filed on Oct. 5, 2020, the entire disclosure of which is incorporated herein by reference.

TECHNICAL FIELD

The disclosure relates generally to a computer network, comprising a Non-IP subnetwork with at least one frontend device; and an IP subnetwork with at least one backend device; and a gateway connecting both subnetworks and translating data communication therebetween, wherein the IP communication between the backend device and the gateway is based on an IP security protocol, providing means for authentication and/or encryption; and wherein the communication between the gateway and the frontend device is a Non-IP communication. Additionally, a safe procedure for operating such a computer network and the components thereof are disclosed.

BACKGROUND

Such computer networks with providing secure interworking of IP network and non-IP network are known form CN211180606U. A Lighting system using tunneling and DALI protocol are known from US2008/0265799, WO 2016/0075107 and WO2015/054611 as well as from EP3525555.

The internet of things (IoT) concerns a connection of heterogenous objects to a typically cloud based backend device. These objects may comprise smart personal devices, automation set-ups with home appliances and systems for entertainment, illumination and surveillance as well as factory machines with sensors and actors to name a few. The backend device provides data to the object (frontend device) or allows it to access corporate applications based on cloud computing.

The aforementioned connectivity of IoT systems causes crucial security risks, which are alleviated within IP networks by establishing a secure communication tunnel between remote hosts based on an IP security protocol such as the stream oriented Transport Layer Security (TLS), Secure Sockets Layer (SSL), Internet Protocol Security (IPsec) or Datagram Transport Layer Security (DTLS), wherein DTLS could be transported via the User Datagram Protocol (UDP) and preserves the underlying transport's semantics.

In the context of the present application IP stands for "Internet Protocol", which defines packet structures for encapsulating data to be communicated to a remote destination host and which is operated according to the multilevel OSI model. The data encapsulation leads to packets with headers containing IP address information, wherein packets are datagrams at level L3 (network layer) of the OSI model. Without limitation of the present application, currently, the major IP versions are IPv4 and IPv6.

An IP security protocol could prevent eavesdropping, tempering or message forgery of the communication between hosts of an IP network or linked IP networks. However, it could not be applied without further measures if a Non-IP subnetwork device participates in the communication. This is often the case if an unsophisticated frontend device, such as a smart light system or a sensor of a machine tool, has to be incorporated within an IoT system. Usually, such an ordinary frontend device is part of a Non-IP subnetwork, providing a communication, which is not IP based. Non-IP communication could for example rely on Digital Addressable Lighting Interface (DALI) or a communication via Zigbee, Bluetooth or a field bus, e.g. KNX. Moreover, a gateway is typically used as bridge between a Non-IP subnetwork and an IP subnetwork, especially by realizing data translation as disclosed by U.S. Pat. No. 8,837,485 B2.

A possible way to enhance the trustworthiness of a Non-IP subnetwork is to apply hop-by-hop authentication and using encryption of messages exchanged between the frontend device and the gateway by applying pre-shared keys. However, the protocol for the hop-by-hop authentication within Non-IP subnetworks is often vendor specific. Furthermore, safe hop-by-hop data transport until the gateway does not solve the issue of broken end-to-end security, since data leaving the Non-IP subnetwork has to be decrypted by the gateway before being sent to a backend within an IP subnetwork. In that scenario, a Non-IP subnetwork frontend device is not capable to determine if the gateway got compromised or not.

For a more sophisticated approach towards end-to-end security TLS/DTLS session resumption has been proposed. This requires an initial TLS/DTLS handshake between the IP subnetwork backend device and the gateway, leading to session information handed over to the Non-IP subnetwork frontend device in a next step. Based thereon, a Non-IP subnetwork frontend device is capable to generate a new session key. However, the trustability of the gateway would still be an issue because a data packet with a resumption request, transmitted via the gateway, would allow reconstructing the new session key from the known information of the previous session.

Since the gateway represents a major security hazard of mixed IP/Non-IP networks, it is often the case that non-standardized proprietary security software is applied, leading to an interoperability concern, since a frontend device of a first vendor might not be accepted as compatible with a second vendor's gateway.

SUMMARY

The object of the present disclosure is to alleviate the above-mentioned problems and to describe a computer network, capable of establishing a non-vendor specific, secure end-to-end communication between a frontend device of a Non-IP subnetwork and a backend device of an IP subnetwork. Furthermore, interoperable components of the computer network and a safe operating procedure for the computer network are to be disclosed.

A computer network may include a Non-IP subnetwork with at least one frontend device; and an IP subnetwork with at least one backend device; and a gateway device connecting the Non-IP subnetwork with the IP subnetwork and translating data communication therebetween, wherein the communication between the backend device and the gateway is based on a IP security protocol, providing means for authentication and/or encryption; and wherein the communication between the gateway and the frontend device is a Non-IP communication.

With this starting point, the inventors have realized that in order to establish a secure end-to-end communication between the backend device and the frontend device, the gateway has to be configured to realize a connection establishment (handshaking) without translating request datagram received from the backend device. Figuratively speaking, the gateway should act "transparent" during handshaking. To realize this functionality, the gateway is configured to provide a virtual IP communication endpoint, dedicated to the frontend device. The backend device keeps a mapping table, which relates a virtual IP communication endpoint of the gateway to the frontend device, wherein for a non-limiting implementation, the information regarding the mapping is provided by the gateway upon scanning the available frontend devices of the Non-IP subnetwork.

In the following, it is supposed that the backend device initiates the handshaking. However, this is not mandatory and should not limit the claims since the handshaking could also be triggered by the frontend device. Furthermore, the specific handshaking procedure depends on the chosen IP security protocol. Regarding the non-limiting choice of DTLS as IP security protocol further details in that respect are disclosed below. In a non-limiting embodiment, it is merely of concern that the gateway is configured to hand over a request datagram originating from the backend device, which is transmitted to the virtual IP communication endpoint, to the frontend device in a transparent manner. This is achieved by transmitting a transcription of the request datagram to the frontend device using the Non-IP communication. This means that the gateway does not provide a translation or interpretation of the request datagram's data content to the frontend device but transmits it piggy-backed on top of the Non-IP communication.

This includes the possibility of an at least in-part deencapsulation of the request data datagram prior to the transmission in order to reach a different level according to the OSI Model, for which the present application uses the term of a "transcription of the request data datagram". Therefore, one possibility would be to hand over the unaltered request datagram via the Non-IP communication, wherein in that case the request datagram and the corresponding transcription thereof are the same. For a further possibility, a de-encapsulation up the stack is conducted by the gateway before the transcription of the request data datagram is handed over to the frontend device. For example, the request datagram could be received as a request frame and the transcription thereof could be a request packet.

According to an embodiment, the virtual IP communication endpoint comprises a virtual IP address at the network layer (L3) and the request datagram comprises a request data packet with a header specifying the backend device as source and the virtual IP address as destination.

Possible Non-IP communication could be based on Zigbee, Bluetooth or a field bus such as KNX, wherein different non-IP communication protocols are feasible. This includes vendor specific non-IP communication. Additionally, the gateway could be configured to apply different non-IP communication protocols for heterogeneous frontend devices within a Non-IP subnetwork. Furthermore, a frontend device could feature a custom application layer, providing a set of commands for its operation.

According to an embodiment, the Non-IP communication is based on the Digital Addressable Lighting Interface (DALI). For this case, the data content of a request datagram directed to the virtual IP communication endpoint is not interpreted and translated by the gateway, which would lead to a set of DALI commands for controlling a frontend, but a mere transcription thereof is transmitted to a frontend device by applying the DALI write command and specifying a memory section of the frontend device, which is reserved for the purpose of storing handshaking datagrams originating from the backend device.

A frontend device does not necessarily require a hardware modification, which is a plus especially for unsophisticated frontend devices. The only requirement for an embodiment is that the firmware is modified such that the frontend device could run a basic implementation of the IP security protocol, which is at least capable of conducting the handshaking. For this purpose, the frontend device according to some aspects is configured to interpret the transcription of the request datagram and to generate a response datagram with a header specifying the virtual IP communication endpoint as source and the backend device as destination. Furthermore, the frontend device is required to be capable of transmitting a transcription of the response datagram to the gateway by applying the Non-IP communication. According to alternative aspects explained in further detail below, the frontend device is kept as simple as possible, wherein the IP security protocol may not be fully implemented within the frontend device itself. Instead, the frontend device is remotely controlled by the backend device.

Furthermore, the gateway is configured to be capable to receive the transcription of the response datagram from the frontend device by applying the Non-IP communication and to transmit a second transcription of the response datagram to the backend device by applying the IP communication. The second transcription of the response datagram could be the same as the original transcription of the response datagram or it could be an encapsulation down the stack of the received original.

Furthermore, the second transcription of the response datagram could provide a modified or extended header at least on one level according to the OSI model. It is also possible that it is the duty of the gateway to provide the initial header information with the virtual IP communication endpoint as source of the second transcription of the response datagram and the backend device as destination.

For some embodiments, the secure end-to-end communication between the backend device and the frontend device is established with symmetric encryption requiring pre-shared keys. The exchange thereof could be conducted at the manufacturing time of the frontend device. Even though there is only a single initial key pair for the symmetric encryption, security is preserved since the actual session key is changed every time a new secure session is created. This provides additional security in case of a broken session, because not all future sessions are jeopardized.

As an alternative, asymmetric encryption is applied, which is certificate-based. However, the computational costs therefore are much higher, wherein in case of an asymmetric encryption it is favorable to add an encryption chip to the frontend device.

Once the secure end-to-end communication between the backend device and the frontend device is established, the gateway cannot eavesdrop the communication or alter its content. Furthermore, a Man-in-the-Middle Attack (MITM) or a Replay Attack are no longer possible.

A further benefit results from the circumstance that for a non-limiting embodiment there is no requirement to alter hardware components of the frontend device and/or the backend device. A non-limiting implementation is achieved by modifying the firmware especially of the gateway and/or the frontend device in order to realize the piggy-backing of the transcriptions of the request and response datagrams with Non-IP communication and to add the additional functionality of a basic IP security protocol implemented by the frontend device.

For a further development, measures are taken to decrease the computational load on the side of the frontend device. This could be achieved by an embodiment for which the frontend device does not run an implementation of the IP security protocol by itself. Instead, the interpretation of the transcription of the request data datagram received by the frontend device is controlled by the backend device. To do so, the backend device is configured to send additional request datagrams via the gateway using piggy-backing on top of the Non-IP communication, which encapsulates directly executable commands of the frontend device's application layer, for example DALI commands, to control actions of the frontend device. This allows keeping an unsophisticated frontend device with no additional persistent memory requirements.

Choices for the IP security protocol are Transport Layer Security (TLS), Secure Sockets Layer (SSL), Internet Protocol Security (IPsec) or Datagram Transport Layer Security (DTLS). From this group. DTLS leads to a small network protocol overhead and a relatively modest implementation size. Thus, the memory size requirements for the backend device, the gateway and the frontend device are ease and the network traffic could be kept low. Additionally, DTLS could be transported via the session-less User Datagram Protocol (UDP). Therefore, for some aspects, the gateway provides a virtual IP communication endpoint dedicated to the frontend device, comprising a dedicated UDP socket for receiving a request datagram in form of a request frame from the backend device.

In case that the Non-IP subnetwork comprises a plurality of frontend devices, it is possible to configure the gateway with a corresponding number of dedicated UDP sockets and to comprise a mapping table, relating each dedicated UDP socket with one of the frontend devices. For an alternative embodiment a single UDP socket is used and multiplexing thereof is applied based on a DTLS extension header providing address information for conducting the Non-IP communication with a selected one of the frontend devices.

BRIEF DESCRIPTION OF THE DRAWINGS

Non-limiting embodiments become apparent form the following description, which refers to the accompanying drawings. Identical, similar or equivalent elements are provided with the same reference signs in the figures. The figures and the proportions of the elements represented in the figures among each other are not to be considered as true to scale. Rather, individual elements may be oversized for better representability and/or for better comprehensibility.

DETAILED DESCRIPTION

Figure 1:
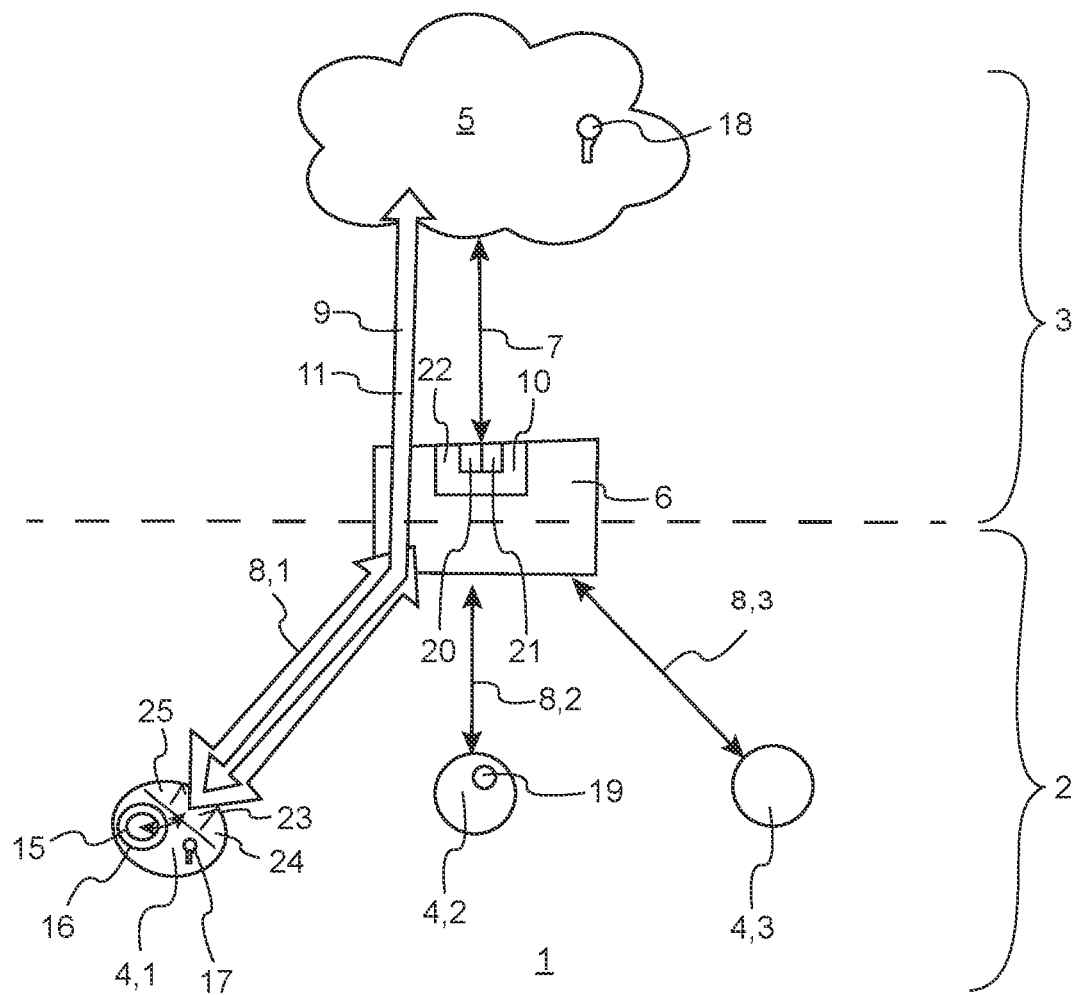
FIG. 1 is a scheme of a non-limiting embodiment of the inventive computer network.

FIG. 1 depicts schematically an embodiment of the inventive computer network (1), comprising a Non-IP subnetwork (2) with frontend devices (4.1, 4.2, 4.3), which might be sensors and/or actuators of an IoT system, and an IP subnetwork (3) with a backend device (5), possibly a cloud. A gateway (6) connects the Non-IP subnetwork (2) with the IP subnetwork (3) and translates the communication therebetween. The Non-IP communication (8.1, 8.2, 8.3) within the Non-IP subnetwork (2) could be based on Digital Addressable Lighting Interface (DALI). In that case, the gateway (6) is or contains a DALI controller.

An IP security protocol (9), providing means for authentication and/or encryption, is applied to preserve the security of the IP communication (7) within the IP subnetwork (3), wherein for the present embodiment Datagram Transport Layer Security (DTLS) is chosen as IP security protocol (9). According to a non-limiting embodiment, the secure communication is extended to the frontend devices (4.1, 4.2, 4.3) within the Non-IP subnetwork (2) by piggy-backing datagrams of the DTLS communication using the protocol of the Non-IP communication (8.1, 8.2, 8.3), which is based on standard DALI commands for the embodiment shown.

For the secure end-to-end communication (11) between each on of the frontend devices (4.1, 4.2, 4.3) and the backend device (5), it is possible to apply a symmetric encryption based on a pair of pre-shared keys (17, 18), which are exchanged and stored within a respective frontend device (4.1, 4.2, 4.3) and the backend device (5). The generation of the pre-shared keys (17, 18) could be conducted during the production of the frontend device (4.1, 4.2, 4.3), wherein programming using DALI or a specific setting of needle-adapters may be applied thereto and, consecutively, the backend device (5) receives its respective part of the key pair by a separate communication route during the installation of a frontend device (4.1, 4.2, 4.3) within the Non-IP subnetwork (2), possibly using wireless communication.

To avoid safety hazards related to the gateway (6), it is required that the gateway (6) acts "transparently" during the handshaking procedure for establishing a secure end-to-end communication (11) between one of the frontend devices (4.1, 4.2, 4.3) and the backend device (5). This means that the gateway (6) does not translate received datagrams, which are identified as belonging to the initiation of a secure session between the backend device (5) and one of the frontend devices (4.1, 4.2, 4.3), by extracting the data content and generating DALI commands therefrom but rather transmits the respective datagram on top of the DALI Non-IP communication (8.1, 8.2, 8.3). For this purpose, the gateway (6) provides at least one virtual IP communication endpoint (10), wherein for the present embodiment, the virtual IP communication endpoint (10) comprises a virtual IP address (20) at the network layer (L3), which is dedicated to one of the frontend devices (4.1, 4.2, 4.3).

Since DTLS is used as the IP security protocol (9) the virtual IP communication endpoint (10) further comprises a dedicated UDP socket (21) at the transport layer (L2). For the assignment to the frontend devices (4.1, 4.2, 4.3) a corresponding number of dedicated UDP sockets (21) (not shown) along with a mapping table (22), containing the DALI address data of the frontend devices (4.1, 4.2, 4.3), could be applied. Alternatively, the gateway (6) is configured with a single dedicated UDP socket (21) and a scheme for multiplexing thereof, based on an DTLS extension header, providing address information for conducting the Non-IP communication (8.1, 8.2, 8.3) with a selected one of the frontend devices (4.1, 4.2, 4.3), is utilized.

The handshaking to establish a secure end-to-end communication (11) between one of the frontend devices (4.1, 4.2, 4.3) and the backend device (5) may comprise the exchange of several datagrams through a "transparent"

gateway (6). In the following, for the sake of simplicity, one datagram exchange initiated by the backend device (5) is described in an exemplary manner.

Upon receipt of a request datagram with a header specifying the backend device (5) as source and the virtual IP communication endpoint (10) as destination, the Non-IP communication (8.1, 8.2, 8.3) is applied to transmit a transcription of the request datagram to the respective frontend device (4.1, 4.2, 4.3).

For the present embodiment, the request datagram is received by a dedicated UDP socket (21) in form of a request frame. The transcription of the request datagram could be the unaltered, original request datagram or a de-encapsulation thereof up the stack of the OSI model, such as a request data packet. According to a non-limiting embodiment, the gateway (6) does not alter the data content of the request datagram. Especially, no DALI commands are derived therefrom by the gateway (6). Instead the gateway (6) uses its mapping table (22) to identify the frontend device (4.1, 4.2, 4.3) to which the secure end-to-end communication (11) should be established and applies a DALI write command to store a complete transcription of the request datagram on a first reserved memory section (23) of the respective frontend device (4.1, 4.2, 4.3).

For the present embodiment, the frontend device (4.1, 4.2, 4.3) comprises a basic implementation of the IP security protocol (15) DTLS for the interpretation of the transcription of the request datagram. Therefore, it is capable to prepare a response datagram utilizing its own firmware and memory capacity. A transcription of the response datagram could be stored on a second reserved memory section (24) of the frontend device (4.1, 4.2, 4.3) and a third memory section (25) thereof is utilized to depict DTLS status information, such as "waiting for a DTLS request", "request in process" and "response ready". The later allows triggering a pick-up of the transcription of the response datagram by the gateway (6), utilizing a DALI read command for realizing the piggy-backing based on the Non-IP communication in the backward direction.

Once the gateway (6) receives the transcription of the response datagram, it prepares a second transcription therefrom to be transmitted to the backend device (5). The resulting second transcription of the response datagram keeps the data section of the original received from the frontend device (4.1, 4.2, 4.3) unchanged. However, it is possible that the address handling is performed by the gateway along with an encapsulation down the stack. Therefore, the gateway may generate a second transcription with a modified and/or extended header at least on one level according to the OSI model, which incorporates the virtual IP communication endpoint (10) as source and the backend device (5) as destination.

Figure 2:
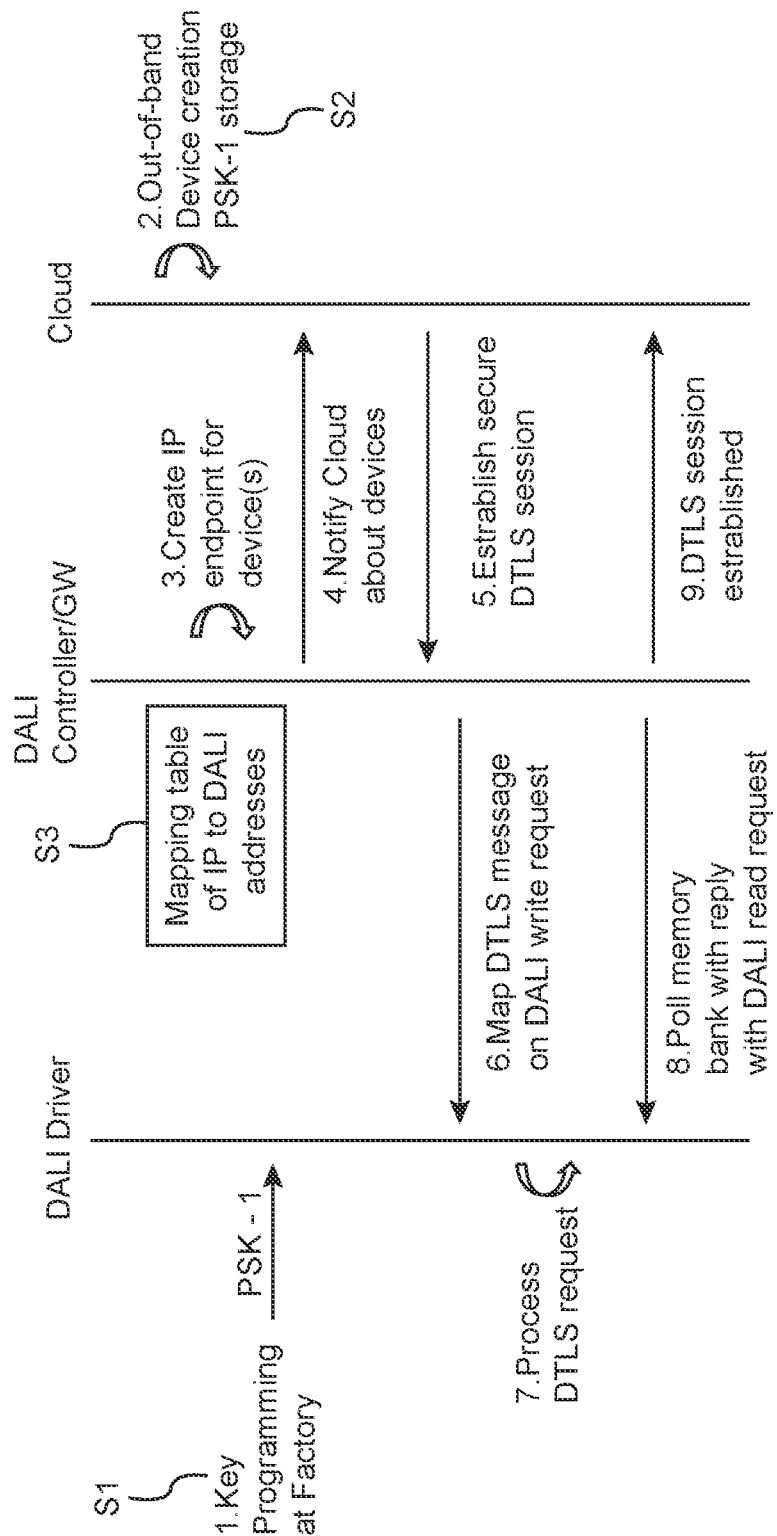
FIG. 2 illustrates the steps for establishment a secured DTLS communication using a DALI setup.

FIG. 2 shows the various step for establishment a DTLS communication using the above-described concept with a pre-share key for field devices using DALI-based communication.

As explained, the first step S1 concerns the implementation a pre-shared key PSK-1 in the DALI device. For the purpose of this example, any device implementing the DALI protocol will be suitable. Typical DALI capable devices include LED-drivers, smart home appliances and he like. The pre-shared key is also provided in step S2 to the cloud to the cloud backend to which the DALI device would connect when deployed in an installation having a gateway. The deployment utilizes a different secured communication channel to avoid compromise of the pre-shared key. The pre-shared key is also registered with the serial number of the DALI device at the cloud.

In step S3, the DALI controller will create a mapping table to associate DALI addresses (i.e. the addresses of the DALI capable devices connected to the controller) to additional IP host addresses. The cloud backend is notified in step S4 of the devices. As outlined herein, this process enables the cloud backend to establish a DTLS communication (with each DALI device) which resides on top of IP.

In step S5, a secure DTLS session is established between the cloud backend solution and the DALI controller acting as gateway. As outlined above any request to establish such connection is mapped on a DALI write request by the DALI controller and forwarded to the respective DALI device addressed in the request. The request inside the DALI message is thus piggy-packed onto the DALI packet and frame.

The DALI device will process the DTLS request in step S7. For this purpose, the DALI device maps the DTLS request and response frames on memory banks within the device, while using standard DALI read and write commands. Hence, each received DTLS frame is written to the memory banks. Three memory banks are reserved, a first one for storing DTLS frame request handling incoming DTLS requests from the DALI controller and gateway. A second memory stores DTLS responses of the processed request. Finally, a third memory bank is used to provide a status indication using a simple one-byte status:

Status 0: waiting for DTLS request;
Status 1: request in process; and
Status 2: response ready During the handshake and after its completion, leading to a secure end-to-end communication between the backend device (5) and one of the frontend devices (4.1, 4.2, 4.3), the gateway (6) cannot get in possession of the session key, which is changed every time a new secure session is generated.

As an alternative, not shown, the requirement to implement the DTLS IP security protocol (15) within the frontend device (4.1, 4.2, 4.3) is eased, which is a benefit especially for very basic frontend devices (4.1, 4.2, 4.3) having limited persistent memory. This is achieved by adding extra functionality to the backend device (5), which in that case has to support DALI commands of an application layer (16) of the frontend device (4.1, 4.2, 4.3). This allows to control the actions taken by the frontend device (4.1, 4.2, 4.3) for handling the handshake remotely, since the backend device (5) is capable to send control datagrams, encapsulating directly executable DALI commands to the frontend device (4.1, 4.2, 4.3). In turn, the gateway (6) is configured to send a transcription of the control datagram to the frontend device (4.1, 4.2, 4.3) by applying the Non-IP communication (8.1, 8.2, 8.3).

Furthermore, the above-explained symmetrical encryption could be replaced by asymmetric encryption. However, the computational cost of handling the mandatory certificates leads to a non-limiting embodiment, for which an encryption chip (19) is added as shown for frontend device (4.2).

LIST OF REFERENCE NUMERALS 1 computer network
2 Non-IP subnetwork
3 IP subnetwork
4.1, 4.2
4.3 frontend device 5 backend device
6 gateway
7 IP communication
8.1, 8.2,
8.3 Non-IP communication
9 IP security protocol
10 virtual IP communication endpoint
11 secure end-to-end communication
15 implementation of the IP security protocol
16 application layer
17 pre-shared key
18 pre-shared key
19 encryption chip
20 virtual IP address
21 dedicated UDP socket
22 mapping table
23 first reserved memory section
24 second reserved memory section
25 third reserved memory section

What is claimed is:

1. A computer network comprising:
a Non-Internet Protocol (IP) subnetwork with at least one frontend device;
an IP subnetwork with at least one backend device;
a gateway connecting the Non-IP subnetwork with the IP subnetwork and translating communication therebetween, wherein the communication between the backend device and the gateway is an IP communication based on an IP security protocol, providing means for authentication and/or encryption; and
wherein the communication between the gateway and the frontend device is a Non-IP communication;
wherein the gateway is configured to provide a virtual IP communication endpoint, dedicated to the frontend device, wherein for establishing a secure end-to-end communication between the backend device and the frontend device, the gateway is configured such that upon receipt of a request datagram with a header specifying the backend device as source and the virtual IP communication endpoint as destination, the Non-IP communication is applied to transmit a transcription of the request datagram to the frontend device; and
wherein the frontend device is configured to generate a response datagram and to transmit a transcription of the response datagram to the gateway by applying the Non-IP communication; wherein the frontend device is configured to run an implementation of the IP security protocol such that the frontend device is capable to interpret the transcription of the request data datagram.

2. The computer network according to claim 1, wherein the frontend device is configured to generate a header of the response datagram, wherein the header specifies the virtual IP communication endpoint as source and the backend device as destination.

3. The computer network according to claim 1, wherein the backend device is configured such that interpretation of the transcription of the request datagram, received by the frontend device, is controlled by the backend device by sending at least one control datagram, encapsulating commands of an application layer of the frontend device, wherein the gateway is configured to send a transcription of the control datagram to the frontend device by applying the Non-IP communication.

4. The computer network according to claim 1, wherein the gateway is configured to receive the transcription of the response datagram, sent via the Non-IP communication from the frontend device, and to transmit a second transcription of the response datagram to the backend device by applying the IP communication.

5. The computer network according to claim 4, wherein the second transcription of the response datagram provides a modified and/or extended header at least on one level according to the Open Systems Interconnection (OSI) model, which incorporates the virtual IP communication endpoint as source of the second transcription of the response datagram.

6. The computer network according to claim 1, wherein the frontend device and the backend device are configured such that the secure end-to-end communication therebetween applies symmetric encryption based on pre-shared keys.

7. The computer network according to claim 1, wherein the frontend device and the backend device are configured such that the secure end-to-end communication therebetween applies asymmetric encryption, wherein the frontend device comprises an encryption chip.

8. The computer network according to claim 1, wherein the virtual IP communication endpoint comprises a virtual IP address at the network layer and the request datagram comprises a request data packet with a header specifying the backend device as source and the virtual IP address as destination.

9. The computer network according to claim 1, wherein the Non-IP communication is based on Digital Addressable Lighting Interface (DALI).

10. The computer network according to claim 1, wherein Datagram Transport Layer Security (DTLS) is applied as the IP security protocol.

11. The computer network according to claim 10, wherein the gateway provides the virtual IP communication endpoint dedicated to the frontend device with a dedicated User Datagram Protocol (UDP) socket.

12. The computer network according to claim 11, wherein the Non-IP subnetwork comprises a plurality of frontend devices and the gateway is configured with a corresponding number of dedicated UDP sockets and a mapping table, relating each dedicated UDP socket with one of the frontend devices.

13. The computer network according to claim 12, wherein the Non-IP subnetwork comprises a plurality of frontend devices and the gateway is configured with a single dedicated UDP socket and a scheme for multiplexing thereof, based on an DTLS extension header, providing address information for conducting the Non-IP communication with a selected one of the frontend devices.

14. A frontend device for a computer network configured to communicate with a gateway within a Non-Internet Protocol (IP) subnetwork by applying a Non-IP communication; and
wherein the gateway is configured to communicate with a backend device within an IP subnetwork by applying IP communication based on an IP security protocol, which provides means for authentication and/or encryption; and
wherein the frontend device is configured to run an implementation of the IP security protocol such that the frontend device is capable to interpret a transcription of a request data datagram sent from the gateway by applying Non-IP communication.

15. A method for operating a computer network, wherein the computer network comprises:
a Non-Internet Protocol (IP) subnetwork with at least one frontend device; and an IP subnetwork with at least one backend device; and
a gateway connecting the Non-IP subnetwork with the IP subnetwork and translating communication therebetween, wherein the communication between the backend device and the gateway is an IP communication based on an IP security protocol, providing means for authentication and/or encryption; and
wherein the communication between the gateway and the frontend device is a Non-IP communication;
wherein the method comprises:
transmitting a request datagram for establishing a secure end-to-end communication between the backend device and the frontend device from the backend device to a virtual IP communication endpoint provided by the gateway, wherein the virtual IP communication endpoint is dedicated to the frontend device;
transmitting a transcription of the request datagram from the gateway to the frontend device by applying the Non-IP communication;
executing an implementation of an IP security protocol such that the frontend device is capable to interpret the transcription of the request data datagram;
generating a response datagram by the frontend device;
transmitting a transcription of the response datagram from the frontend device to the gateway by applying the Non-IP communication; and
transmitting a second transcription of the response datagram from the gateway to the backend device by applying the IP communication.

16. The method according to claim 15, wherein the second transcription of the response datagram provides a header at least on one level according to the Open Systems Interconnection (OSI) model, which incorporates the virtual IP communication endpoint as source of the second transcription of the response datagram.

* * * * *